(12) United States Patent  
Ovard et al.

(10) Patent No.: US 8,855,169 B2  
(45) Date of Patent: *Oct. 7, 2014

(54) METHODS AND APPARATUS FOR RFID TAG COMMUNICATIONS

(75) Inventors: David K. Ovard, Meridian, ID (US); Roy Greeff, Boise, ID (US)

(73) Assignee: Round Rock Research, LLC, Parsippany, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/620,243

(22) Filed: Sep. 14, 2012

(65) Prior Publication Data

US 2013/0069767 A1    Mar. 21, 2013

Related U.S. Application Data

(63) Continuation of application No. 13/032,566, filed on Feb. 22, 2011, which is a continuation of application No. 11/847,654, filed on Aug. 30, 2007, now abandoned, which is a continuation of application No. 11/781,884, filed on Jul. 23, 2007, now abandoned, which is a continuation of application No. 09/961,113, filed on Sep. 20, 2001, now abandoned, which is a continuation of application No. 09/066,610, filed on Apr. 24, 1998, now Pat. No. 6,459,726.

(51) Int. Cl.
*H04B 1/00*    (2006.01)

(52) U.S. Cl.
USPC .......... 375/146; 375/219; 375/141; 340/10.1; 340/572.1

(58) Field of Classification Search
CPC ............ G06K 7/0008; G06K 19/0723; H01Q 1/2208; H04B 7/22; H04B 1/707; H04J 13/0022

USPC ............... 375/146, 219, 141; 340/10.1, 572.1
See application file for complete search history.

(56) References Cited

U.S. PATENT DOCUMENTS 384,568 A    6/1888  Evans
912,628 A    2/1909  Sherman
(Continued)

FOREIGN PATENT DOCUMENTS

EP    0328836    10/1988
EP    0362984    5/1989
(Continued)

OTHER PUBLICATIONS

Kavehrad, "Design and Experimental Results for a Direct-Sequence Spread-Spectrum Radio Using Differential Phse-Shift Keying Modulation for Indoor, Wireless Communications," IEEE Journal on Selected Areas in Communications, vol. 5, Issue: 5 Publication year: 1987, pp. 815-823.

(Continued)

*Primary Examiner* — Juan A Torres
(74) *Attorney, Agent, or Firm* — Gazdzinski & Associates, PC

(57) ABSTRACT

The present invention provides backscatter interrogators, communication systems and backscatter communication methods. According to one aspect of the present invention, a backscatter interrogator includes a data path configured to communicate a data signal; a signal generator configured to generate a carrier signal; and a modulator coupled with the data path and the signal generator, the modulator being configured to spread the data signal to define a spread data signal and amplitude modulate the carrier signal using the spread data signal, the modulator being further configured to phase modulate the carrier signal.

4 Claims, 5 Drawing Sheets

(56) References Cited

U.S. PATENT DOCUMENTS

| | | | |
|---|---|---|---|
| 2,626,786 | A | 1/1953 | McGlothin |
| 2,630,302 | A | 3/1953 | Jones |
| 3,071,351 | A | 1/1963 | Brown et al. |
| 3,615,243 | A | 10/1971 | Scott |
| 3,770,386 | A | 11/1973 | Hayashi et al. |
| 4,075,632 | A | 2/1978 | Baldwin et al. |
| 4,308,617 | A | 12/1981 | German, Jr. |
| 4,888,591 | A | 12/1989 | Landt et al. |
| 4,926,182 | A | 5/1990 | Ohta et al. |
| 4,977,579 | A | 12/1990 | Bateman |
| 5,083,506 | A | 1/1992 | Horn |
| 5,103,459 | A | 4/1992 | Gilhousen et al. |
| 5,157,408 | A | 10/1992 | Wagner et al. |
| 5,157,686 | A | 10/1992 | Omura et al. |
| 5,164,985 | A | 11/1992 | Nysen et al. |
| 5,309,474 | A | 5/1994 | Gilhousen et al. |
| 5,407,266 | A | 4/1995 | Dotsch et al. |
| 5,416,797 | A | 5/1995 | Gilhousen et al. |
| 5,448,110 | A | 9/1995 | Tuttle et al. |
| 5,504,773 | A | 4/1996 | Padovani et al. |
| 5,511,073 | A | 4/1996 | Padovani et al. |
| 5,528,222 | A | 6/1996 | Moskowitz et al. |
| 5,535,239 | A | 7/1996 | Padovani et al. |
| 5,568,483 | A | 10/1996 | Padovani et al. |
| 5,617,060 | A | 4/1997 | Wilson et al. |
| 5,621,412 | A | 4/1997 | Sharpe et al. |
| 5,629,955 | A | 5/1997 | McDonough |
| 5,649,295 | A | 7/1997 | Shober et al. |
| 5,649,296 | A | 7/1997 | MacLellan et al. |
| 5,659,569 | A | 8/1997 | Padovani et al. |
| 5,715,236 | A | 2/1998 | Padovani et al. |
| 5,754,584 | A | 5/1998 | Durrant et al. |
| 5,841,806 | A | 11/1998 | Gilhousen et al. |
| 5,862,172 | A | 1/1999 | Sugita et al. |
| 5,902,625 | A | 5/1999 | Barz |
| 5,952,922 | A | 9/1999 | Shober |
| 6,046,683 | A | 4/2000 | Pidwerbetsky et al. |
| 6,084,530 | A | 7/2000 | Pidwerbetsky et al. |
| 6,107,910 | A | 8/2000 | Nysen |
| 6,130,602 | A | 10/2000 | O'Toole et al. |
| 6,236,315 | B1 | 5/2001 | Helms et al. |
| 6,246,882 | B1 | 6/2001 | Lachance |
| 6,289,209 | B1 | 9/2001 | Wood, Jr. |
| 6,356,705 | B1 | 3/2002 | Ogino et al. |
| 6,415,002 | B1 | 7/2002 | Edwards et al. |
| 6,487,962 | B1 | 12/2002 | Horn |
| 2001/0038875 | A1 | 11/2001 | Lanham, Jr. |
| 2003/0174099 | A1 | 9/2003 | Bauer et al. |
| 2005/0178758 | A1 | 8/2005 | Horn et al. |
| 2007/0152831 | A1 | 7/2007 | Eisele |
| 2008/0122581 | A1 | 5/2008 | Bae et al. |

FOREIGN PATENT DOCUMENTS

| | | |
|---|---|---|
| EP | 0750201 | 6/1996 |
| EP | 0750201 A1 | 12/1996 |
| WO | WO 96/38925 | 12/1996 |
| WO | WO 97/43740 | 11/1997 |
| WO | 2006026811 | 3/2006 |

OTHER PUBLICATIONS

USPTO Transaction History of related U.S. Appl. No. 09/066,610, filed Apr. 24, 1998, entitled "Backscatter Interrogators, Communication Systems and Backscatter Communication Methods," now U.S. Patent No. 6,459,726.

USPTO Transaction History of related U.S. Appl. No. 09/961,113, filed Sep. 20, 2001, entitled "Modulators, Transmitters, a Radio Frequency Identification Device System, Carrier Signal Suppression Methods and Methods of Communication in a Backscatter System," now abandoned.

USPTO Transaction History of related U.S. Appl. No. 11/781,884, filed Jul. 23, 2007, entitled "RFID Communication System and Method of Operation."

USPTO Transaction History of related U.S. Appl. No. 11/847,662, filed Aug. 30, 2007, entitled "Backscatter Interrogators, Communication Systems and Backscatter Communication Methods."

USPTO Transaction History of related U.S. Appl. No. 11/847,671, filed Aug. 30, 2007, entitled "Backscatter Interrogators, Communication Systems and Backscatter Communication Methods."

USPTO Transaction History of related U.S. Appl. No. 11/847,654, filed Aug. 30, 2007, entitled "Backscatter Interrogators, Communication Systems and Backscatter Communication Methods."

International Search Report, International Application No. PCT/US99/08175; Aug. 25, 1999; 6pp.

Charles R. Cahn, Combined Digital Phase and Amplitude Modulation Communication Systems 1960.

J.C. Hancock and R.W. Lucky, Performance of Combined Amplitude and Phase-Modulated Communication Systems 1960.

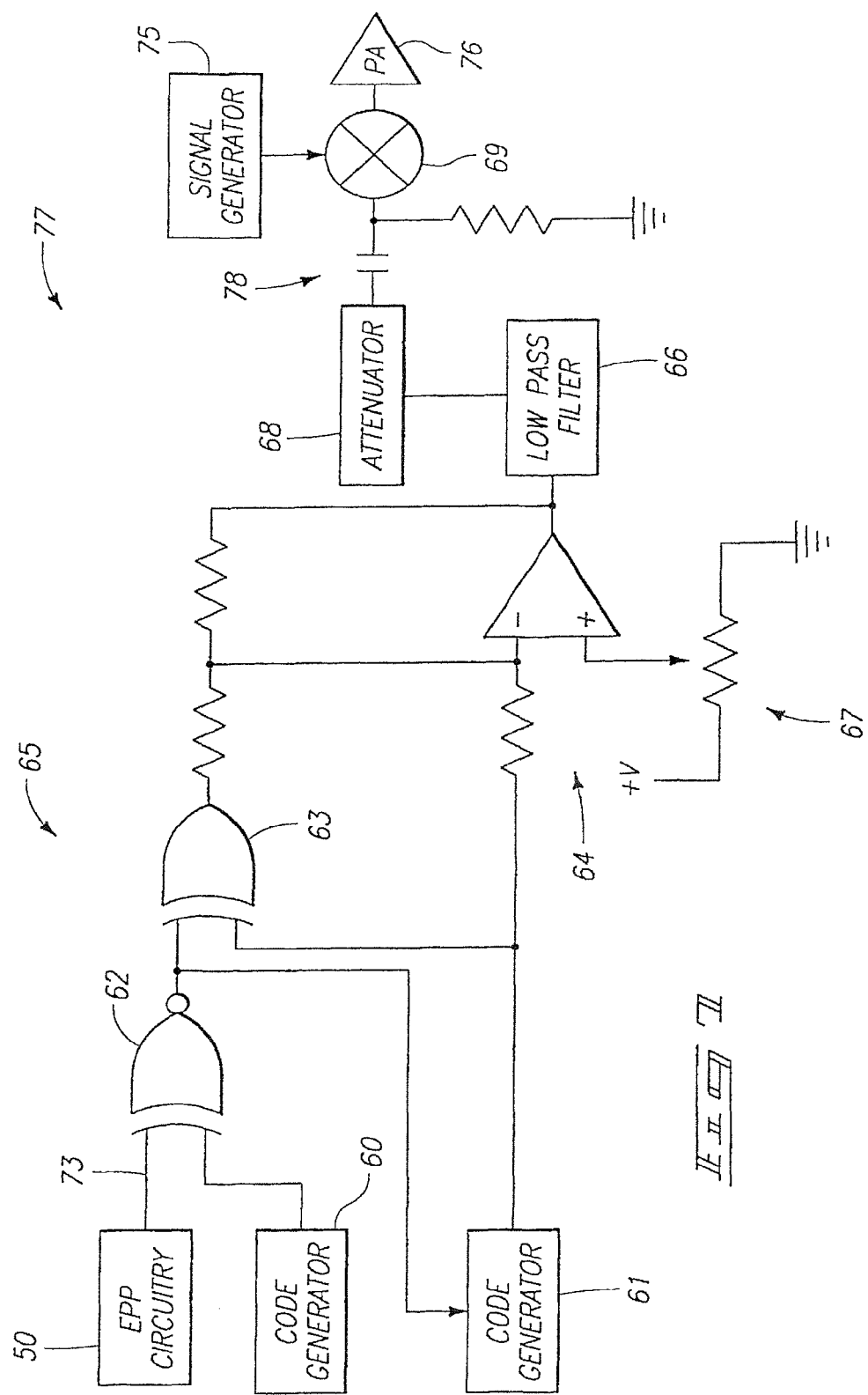

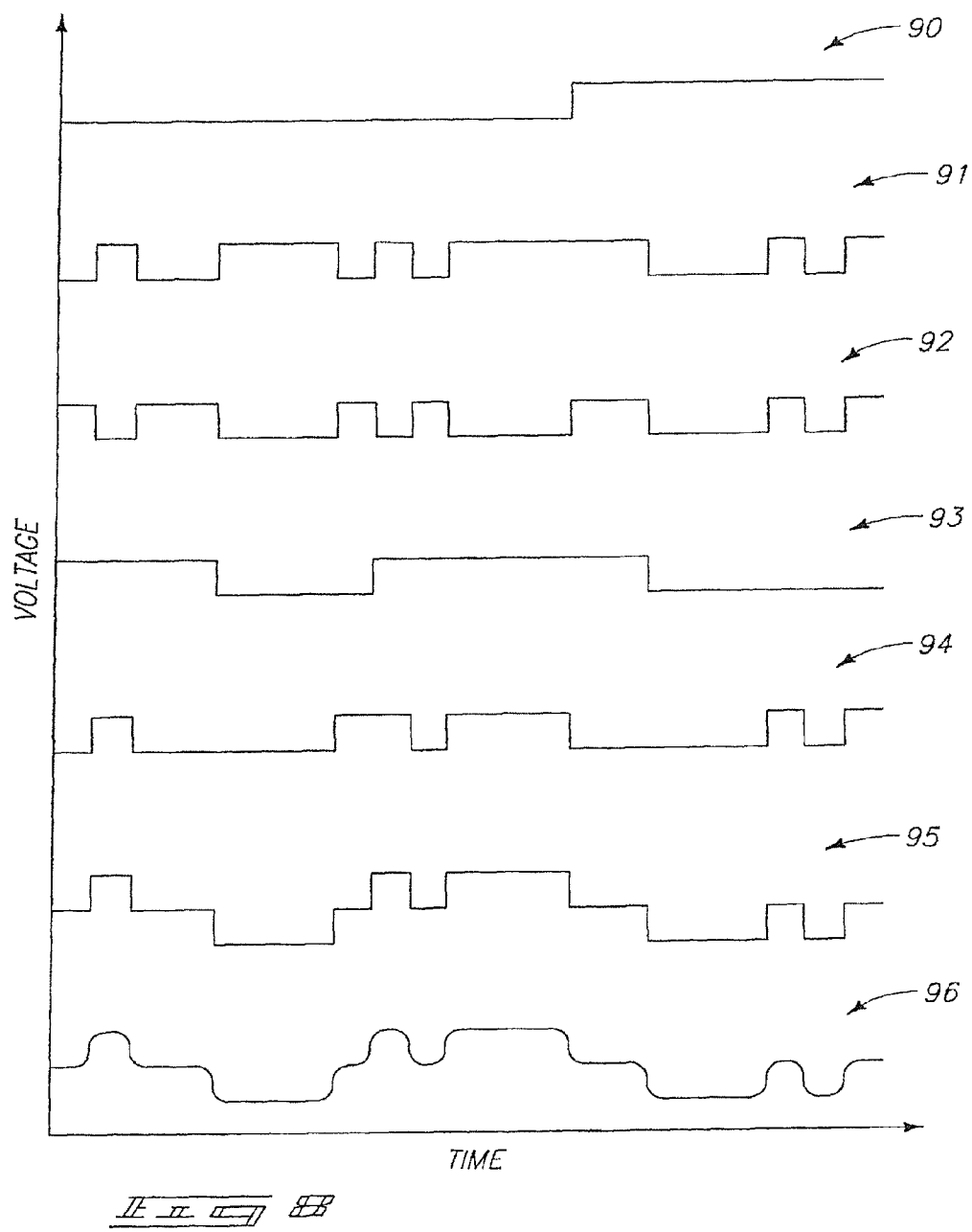

METHODS AND APPARATUS FOR RFID TAG COMMUNICATIONS

PRIORITY

This application is a continuation of, and claims priority to, U.S. patent application Ser. No. 13/032,566 filed on Feb. 22, 2011 of the same title, which is a continuation of U.S. patent application Ser. No. 11/847,654, filed on Aug. 30, 2007, entitled "Methods and Apparatus for RFID Tag Communications", which is a continuation of U.S. patent application Ser. No. 11/781,884, filed on Jul. 23, 2007, entitled "RFID Communication System and Method of Operation", now abandoned, which is a continuation of U.S. patent application Ser. No. 09/961,113, filed on Sep. 20, 2001, entitled "Backscatter Interrogators, Communication Systems and Backscatter Communication Methods", now abandoned, which is a continuation of U.S. patent application Ser. No. 09/066,610, filed on Apr. 24, 1998, of the same title, now U.S. Pat. No. 6,459,726, each of the foregoing being incorporated herein by reference in its entirety.

TECHNICAL FIELD

The present invention relates to backscatter interrogators, communication systems and backscatter communication methods.

BACKGROUND OF THE INVENTION

Backscatter communication systems are known in the art. In a backscatter system, one transponder, such as an interrogator, sends out a command to a remote communications device. After the interrogator transmits the command, and is expecting a response, the interrogator switches to a CW mode (continuous wave mode). In the continuous wave mode; the interrogator does not transmit any information. Instead, the interrogator just transmits radiation at a certain frequency. In other words, the signal transmitted by the interrogator is not modulated. After a remote communications device receives a command from the interrogator, the remote communications device processes the command. The remote communications device of the backscatter system modulates the continuous wave by switching between absorbing RF radiation and reflecting RF radiation. For example, the remote communications device alternately reflects or does not reflect the signal from the interrogator to send its reply. Two halves of a dipole antenna can be either shorted together or isolated from each other to modulate the continuous wave.

One example of a backscatter system is described in commonly assigned U.S. patent application Ser. No. 08/705,043, filed Aug. 29, 1996, and incorporated herein by reference. Another example of a backscatter system is described in U.S. Pat. No. 5,649,296 to MacLellan et al. which is also incorporated herein by reference.

One application for backscatter communications is in wireless electronic identification systems, such as those including radio frequency identification devices. Of course, other applications for backscatter communications exist as well. Most presently available radio frequency identification devices utilize a magnetic coupling system. An identification device is usually provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another wireless electronic identification system utilizes a large, board level, active transponder device affixed to an object to be monitored which receives a signal from an interrogator. The device receives the signal, then generates and transmits a responsive signal. The interrogation signal and the responsive signal are typically radio-frequency (RF) signals produced by an RF transmitter circuit. Because active devices have their own power sources. The active devices do not need to be in close proximity to an interrogator or reader to receive power via magnetic coupling. Therefore, active transponder devices tend to be more suitable for applications requiring tracking of objects that may not be in close proximity to the interrogator, such as a railway car.

Spread spectrum modulation techniques are known Utilization of spread spectrum modulation provides distinct advantages in some communication applications. For example, some spread spectrum modulation techniques enable desired signals to be distinguished from other signals (e.g., radar, microwave ovens, etc.) operating at approximately the same frequencies.

Federal Communication Commission (FCC) regulations require that spread spectrum systems meet various requirements. For example, spread spectrum systems operating in the 2.4-2.485 GHz band should comply with FCC rule 15.247 which states, in relevant part, that the power spectral density cannot be more than +8 dBm in any given 3 kHz bang. Further, the maximum power output is 1 Watt into a 6 dBi gain antenna. The minimum 6 dB bandwidth for a direct sequence spread spectrum is 500 kHz. In addition, the energy within restricted bands of 0-2.390 GHz and 2.4835-2.5 GHz should be lower than 500 uV/m at three meters. Communication systems operating within this specified band should be designed with regard to these regulations.

Amplitude modulation (AM) communication techniques enable communications with the use of relatively straightforward detectors. Typically, such AM detectors can be efficiently implemented with the utilization of relatively few components. However, drawbacks exist with the utilization of amplitude modulation techniques. For example, approximately half the total power of AM communications resides' within the carrier. This limits the power which can be used for communicating data if AM modulation and spread spectrum techniques are utilized within the above specified frequency band.

Therefore, there exists a need to provide communication systems which comply with radio frequency regulations while also providing robust communications.

SUMMARY OF THE INVENTION

The present invention includes backscatter interrogators, communication systems and backscatter communication methods.

One aspect of the invention provides a backscatter interrogator. The backscatter interrogator includes a data path configured to communicate a data signal and a signal generator configured to generate a carrier signal. The carrier signal comprises a microwave signal in preferred embodiments. The interrogator also provides a modulator coupled with the data path and the signal generator. The modulator is configured to spread the data signal to define a spread data signal and amplitude modulate the carrier signal using the spread data signal. The modulator is further configured to phase modulate the carrier signal to reduce the power within the carrier signal.

A second aspect of the present invention provides a backscatter interrogator including a data path configured to communicate a data signal and a signal generator configured to output a microwave carrier signal. The backscatter interrogator further includes a modulator coupled with the data path and the signal generator. One configuration of the modulator is operable to spread the data signal and selectively invert the spread data signal. The modulator is further configured to band limit the inverted spread data signal and modulate the carrier signal using the band limited data signal.

Another aspect of the present invention provides a backscatter communication system including an interrogator and an electronic communication device. The interrogator is configured to spread a data signal. The interrogator is further configured to amplitude modulate a carrier signal using the data signal and phase modulate the carrier signal using the data signal. The interrogator is arranged to output the amplitude modulated and phase modulated carrier signal. The electronic communication device is configured to output a reply signal responsive to reception of the amplitude modulated and phase modulated carrier signal.

Another aspect of the invention provides a backscatter communication method including the steps of providing a data signal and providing a carrier signal. This method also includes spreading the data signal, amplitude modulating the carrier signal using the spread data signal, and phase modulating the carrier signal. The amplitude modulated and phase modulated carrier signal is thereafter communicated.

Another aspect of the invention provides a method of communication a backscatter system including an interrogator and a communication device. The method includes providing a data signal, providing a carrier signal and spreading the data signal. The method also includes modulating the carrier signal using the spread data signal, communicating the modulated carrier signal, and suppressing the carrier signal during the communicating.

Yet another aspect of the invention provides a backscatter communication method including the steps of providing a data signal and a carrier signal. The invention also includes spreading the data signal, selectively inverting the spread data signal, amplitude modulating the carrier signal using the data signal, and communicating the modulated carrier signal.

BRIEF DESCRIPTION OF THE DRAWINGS

Preferred embodiments of the invention are described below with reference to the following accompanying drawings.

FIG. 7 is a circuit schematic of one embodiment of circuitry included in the RF configuration of FIG. 6.

FIG. 8 is an illustrative representation of a tri-level communication signal.

DETAILED DESCRIPTION OF THE PREFERRED EMBODIMENTS

Figure 1:
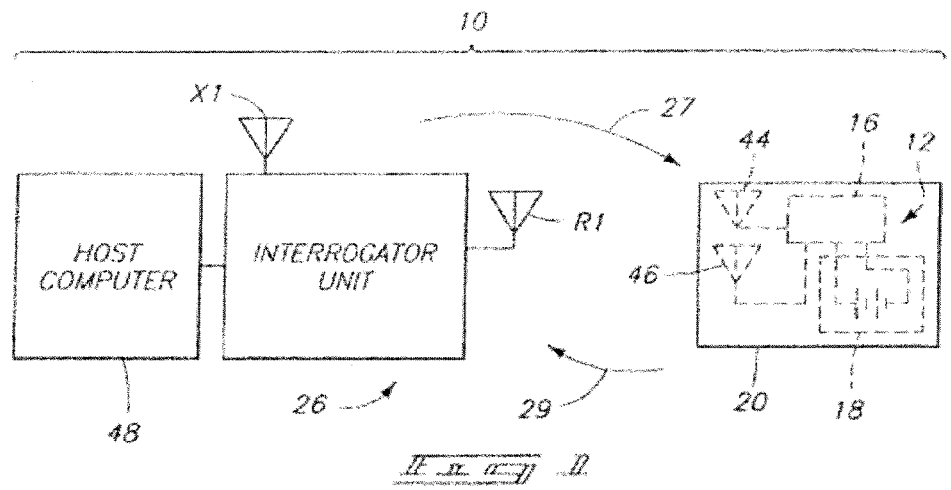
FIG. 1 is a block diagram illustrating a communication system embodying the invention.
Figure 4:
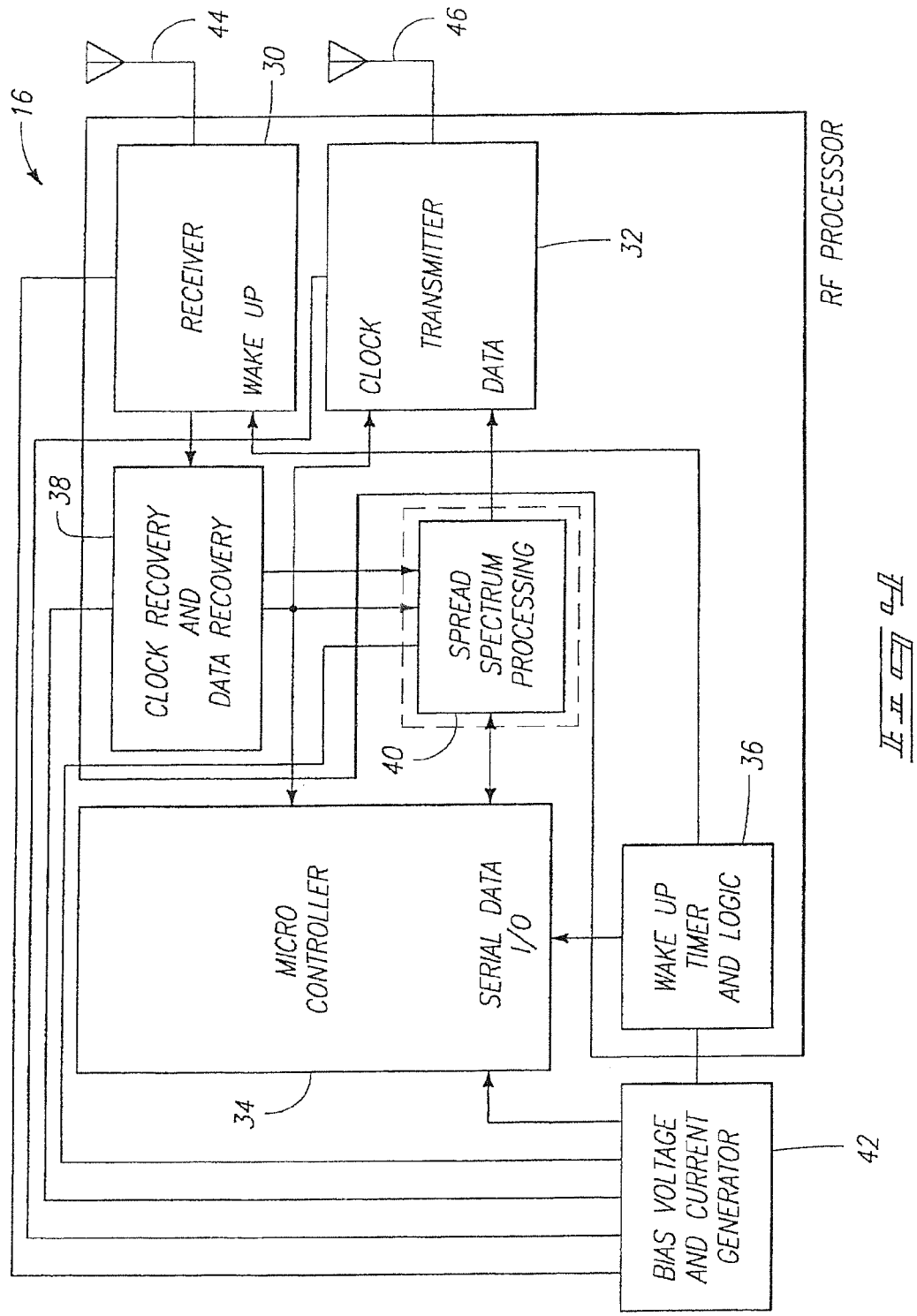
FIG. 4 is a circuit schematic of a transponder included in the system of FIG. 1.

This disclosure of the invention is submitted in furtherance of the constitutional purposes of the U.S. Patent Laws "to promote the progress of science and useful arts" (Article 1, Section 8). FIG. 1 illustrates a wireless communications system 10 embodying the invention. Communications system 10 includes a first transponder including an interrogator 26 and a host computer 48 in communication with interrogator 26. Communications system 10 further includes an electronic communications device 12, such as the device disclosed in U.S. patent application Ser. No. 08/705,043, filed Aug. 29, 1996. In one embodiment, wireless communications device 12 comprises a wireless identification device such as the Microstamp™ integrated circuit available from Micron Communications, Inc., 3176 S. Denver Way, Boise, Id. 83705. Interrogator 26 communicates with the communications device 12 via an electromagnetic link, such as via an RF link (e.g., at microwave frequencies, in one embodiment). While other embodiments are possible, in the illustrated embodiment the communications device 12 includes a transponder 16 having a receiver 30 and a transmitter 32 (FIG. 4). Communications device 12 further includes a power source 18 connected to transponder 16 to supply power to transponder 16. Communications device 12 further includes at least one antenna connected to transponder 16 for wireless transmission and reception. In the illustrated embodiment, communications device 12 includes at least one antenna 46 connected to transponder 16 for radio frequency transmission by transponder 16, and at least one receive antenna 144 connected to transponder 16 for radio frequency reception by transponder 16. In the illustrated embodiment, the transmit antenna 46 is a dipole antenna, and the receive antenna 44 is a loop antenna. In the illustrated embodiment, the transponder 16 is in the form of an integrated circuit. However, in alternative embodiments, all of the circuitry of transponder 16 is not necessarily all included in a single integrated circuit.

Power source 18 is a thin film battery in the illustrated embodiment; however, in alternative embodiments, other forms of power sources can be employed. If the power source 18 is a battery, the battery can take any suitable form. Preferably, the battery type will be selected depencHng on weight, size, and life requirements for a particular application. In one embodiment, the battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the battery comprises a series connected pair of button type cells.

The communications device 12 can be included in any appropriate housing or packaging.

Figure 2:
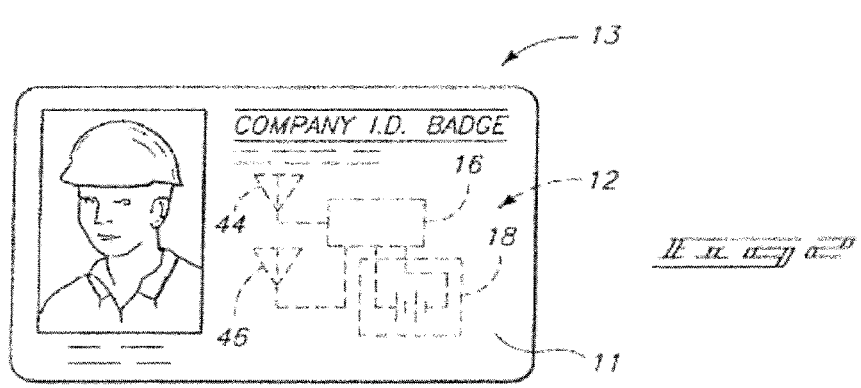
FIG. 2 is a front view of an employee badge according to one embodiment of the invention.

FIG. 2 shows but one example of a housing in the form of a card 11 comprising plastic or other suitable material. The plastic card 11 houses communications device 12 to define an employee identification badge 13 including the communications device 12. In one embodiment, the front face of badge 13 has visual identification features such as an employee photograph or a fingerprint in addition to identifying text.

Figure 3:
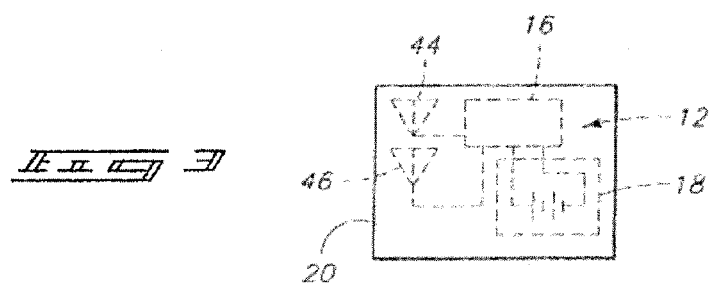
FIG. 3 is a front view of a radio frequency identification tag according to another embodiment of the invention.

FIG. 3 illustrates but one alternative' housing supporting the device 12. More particularly, FIG. 3 illustrates a miniature housing 20 encasing the device 12 to define a tag which can be supported by an object (e.g., hung from an object, affixed to an object, etc.).

Although two particular types of housings have been disclosed, the communications device 12 can be included in any appropriate housing. Communications device 12 is of a small size that lends itself to applications employing small housings, such as cards, miniature tags, etc. Larger housings can also be employed. The communications device 12, housed in any appropriate housing, can be supported from or attached to 2-1 an object in any desired manner.

Interrogator unit 26 includes a plurality of antennas X1, R1, as well as transmitting and receiving circuitry, similar to that implemented in the device 16. The host computer 48 acts as a master in a master-slave relationship with interrogator 26. The host computer 48 includes an applications program for controlling the interrogator 26 and interpreting responses, and a library of radio frequency identification device applications or functions. Most of the functions communicate with interrogator 26. These functions effect radio frequency communication between interrogator 26 and communications device 12.

Communications system 10 includes a transmit antenna X1, and receive antenna R1 connected to interrogator 26. In operation, the interrogator 26 transmits an interrogation signal or command 27 ("forward link") via the antenna X1. The communications device 12 receives the incoming interrogation signal via its antenna 44. Upon receiving the signal 27, the communications device 12 responds by generating and transmitting a responsive signal or reply signal 29 ("return link"). The interrogator 26 is described in greater detail below.

In one embodiment, the responsive signal 29 is encoded with information that uniquely identifies, or labels the particular device 12 that is transmitting, so as to identify any object or person with which communications device 12 is associated.

In the embodiment illustrated in FIG. 1, multiple communications devices 12 can be employed; however, there is no communication between multiple devices 12. Instead, the multiple communications devices 12 communicate with interrogator 26. FIG. 1 illustrates the communications device 12 as being in the housing 20 of FIG. 3. The system would operate in a similar manner if the device 12 is provided in a housing such as the housing 11 of FIG. 2, or any other appropriate housing. Multiple communications devices 12 can be used in the same field of an interrogator 26 (i.e., within communications range of an interrogator 26). Similarly, multiple interrogators 26 can be in proximity to one or more of the devices 12.

The above described system 10 is advantageous over prior art devices that utilize magnetic field effect systems because, with the system 10, a greater range can be achieved, and more information can be obtained (instead of just an identification number).

As a result, such a system 10 can be used, for example, to monitor large warehouse inventories having many unique products needing individual discrimination to determine the presence of particular items within a large lot of tagged products.

FIG. 4 is a high level circuit schematic of the transponder 16 utilized in the devices of FIGS. 1-3. In the embodiment shown in FIG. 4, the transponder 16 is a monolithic integrated circuit. More particularly, in the illustrated embodiment, the integrated circuit 16 comprises a single die, having a size of 209×116 mils2, including the receiver 30, the transmitter 32, a micro controller or microprocessor 34, a wake up timer and logic circuit 36, a clock recovery and data recovery circuit 38, and a bias voltage and current generator 42.

In one embodiment, the communications devices 12 switch between a "sleep" mode of operation, and higher power modes to conserve energy and extend battery life during periods of time where no interrogation signal 27 is received by devices 12, using the wake up timer and logic circuitry 36.

In one embodiment, a spread spectrum processing circuit 40 is included in transponder 16. In this embodiment, signals transmitted and received by interrogator 26, and transmitted and received by communications device 12 are modulated spread spectrum signals. Spread spectrum modulation is described below.

Many modulation techniques minimize required transmission bandwidth. However, the spread spectrum modulation technique employed in the illustrated embodiment requires a transmission bandwidth that is up to several orders of magnitude greater than the minimum required signal bandwidth. Although spread spectrum modulation techniques are bandwidth inefficient in single user applications, they are advantageous where there are multiple users, as is the case with the instant radio frequency identification system 10. The spread spectrum modulation technique of the illustrated embodiment is advantageous because the interrogator signal can be distinguished from other signals (e.g., radar, microwave ovens, etc.) operating at the same frequency. The spread spectrum signals transmitted by communications device 12 and by interrogator 26 are pseudo random and have noise-like properties when compared with the digital command or reply. The spreading waveform is controlled by a pseudo-noise or pseudo random number (PN) sequence or code. The PN code is a binary sequence that appears random but can be reproduced in a predetermined manner by the device 12. More particularly, incoming spread spectrum signals are demodulated by communications device 12 or by interrogator 26 through cross correlation with a version of the pseudo random carrier that is generated by communications device 12 itself or interrogator 26 itself, respectively. Cross correlation with the correct PN sequence unspreads the spread spectrum signal and restores the modulated message in the same narrow band as the original data.

A pseudo-noise or pseudo random sequence (PN sequence) is a binary sequence with an autocorrelation that resembles, over a period, the autocorrelation of a random binary sequence. The autocorrelation of a pseudo-noise sequence also roughly resembles the autocorrelation of band-limited white noise. A pseudo-noise sequence has many characteristics that are similar to those of random binary sequences. For example, "a pseudo-noise sequence has a nearly equal number of zeros and ones, very low correlation between shifted versions of the sequence, and very low cross correlation between any two sequences. A pseudo-noise sequence is usually generated using sequential logic circuits. For example, a pseudo noise sequence can be generated using a feedback shift register.

A feedback shift register comprises consecutive stages of two state memory devices, and feedback logic. Binary sequences are shifted through the shift registers in response to clock pulses, and the output of the various stages are logically combined and fed back as the input to the first stage. The initial contents of the memory stages and the feedback logic circuit determine the successive contents of the memory.

The illustrated embodiment employs direct sequence spread spectrum modulation. A direct sequence spread spectrum (DSSS) system spreads the baseband data by directly multiplying the baseband data' pulses with a pseudo-noise sequence that is produced by a pseudo-noise generator. A single pulse or symbol of the PN waveform is called a "chip." Synchronized data symbols, which may be information bits or binary channel code symbols, are added in modulo-2 fashion to the chips before being modulated. The receiver performs demodulation. For example, in one embodiment the data is amplitude modulated. Assuming that code synchronization has been achieved at the receiver, the received signal passes through a wideband filter and is multiplied by a local replica of the PN code sequence. This multiplication yields the unspread signal.

A pseudo-noise sequence is usually an odd number of chips long. In the illustrated embodiment, one bit of data is represented by a thirty-one chip sequence. A zero bit of data is represented by inverting the pseudo-noise sequence.

Spread spectrum techniques are also disclosed in "Spread Spectrum Systems," by R. C. Dixon, published by John Wiley and Sons, Inc., incorporated herein by reference.

In operation, the interrogator sends out a command that is spread around a certain center frequency (e.g., 2.44 GHz). After the interrogator transmits the command, and is expecting a response, the interrogator switches to a CW mode (continuous wave mode). In the continuous wave mode, the interrogator does not transmit any information. Instead, the interrogator just transmits 2.44 GHz radiation. In other words, the signal transmitted by the interrogator is not modulated. After the communications device 12 receives the command from the interrogator, the communications device 12 processes the command. If communications device 12 is III a backscatter mode it alternately reflects or does not reflect the signal from the interrogator to send its reply. For example, in the illustrated embodiment, two halves of a dipole antenna are either shorted together or isolated from each other to send a reply.

In one embodiment, the clock for the entire integrated circuit 16 is extracted from the incoming message itself by clock recovery and data recovery circuitry 38. This clock is recovered from the incoming message, and used for timing for the micro controller 34 and all the other clock circuitry on the chip, and also for deriving the transmitter carrier or the subcarrier, depending on whether the transmitter is operating in active mode or backscatter mode.

In addition to recovering a clock, the clock recovery and data recovery circuit 38 also performs data recovery on valid incoming signals. The valid spread spectrum incoming signal is passed through the spread spectrum processing circuit 40, and the spread spectrum processing circuit 40 extracts the actual ones and zeros of data from the incoming signal. More particularly, the spread spectrum processing circuit 40 takes the chips from the spread spectrum signal, and reduces each thirty-one chip section down to a bit of one or zero, which is passed to the micro controller 34.

Micro controller 34 includes a serial processor, or I/O facility that receives the bits from the spread spectrum processing circuit 40. The micro controller 34 performs further error correction. More particularly, a modified hamming code is employed, where each eight bits of data is accompanied by five check bits used by the micro controller 34 for error correction. Micro controller 34 further includes a memory, and after performing the data correction, micro controller 34 stores bytes of the data bits in memory. These bytes contain a command sent by the interrogator 26. The micro controller 34 responds to the command.

For example, the interrogator 26 may send a command requesting that any communications device 12 in the field respond with the device's identification number. Status information IS also returned to interrogator 26 from communications device 12 when communications device 12 responds.

The transmitted replies have a format similar to the format of incoming messages. More particularly, a reply starts with a preamble (e.g., all zeros in active mode, or alternating double zeros and double ones in backscatter mode), followed by a Barker or start code, followed by actual data.

The incoming message and outgoing reply preferably also include a check sum or redundancy code so that integrated circuit 16 or interrogator 12 can confirm receipt of the entire message or reply.

Interrogator 26 provides a communication link between a host computer and transponder 16. Interrogator 26 connects to the host computer 48 via an IEEE-1284 enhanced parallel port (EPP). The interrogator communicates with transponder 16 via the RF antennas X1 and R1.

A Maximal Length Pseudo Noise (PN) Sequence is used in the Direct Sequence Spread Spectrum (DSSS) communications scheme in the forward link. In one embodiment, the sequence is generated by a linear feedback shift register. This produces a repeating multiple "chip" sequence.

A zero bit is transmitted as one inverted full cycle of the PN sequence. A one bit is transmitted as one full non-inverted cycle of the PN sequence.

After sending a command, the interrogator sends a continuous unmodulated RF signal with an approximate frequency of 2.44175 GHz. Return link data is Differential Phase Shift Key (DPSK) modulated onto a square wave subcarrier with a frequency of approximately 600 kHz (e.g., 596.1 kHz in one embodiment). A data 0 corresponds to one phase and data 1 corresponds to another, shifted 180 degrees from the first phase. The subcarrier is used to modulate antenna impedance of transponder 16. For a simple dipole, a switch between the two halves of the dipole antenna is opened and closed. When the switch is closed, the antenna becomes the electrical equivalent of a single half-wavelength antenna that reflects a portion of the power being transmitted by the interrogator. When the switch is open, the antenna becomes the electrical equivalent of two quarter-wavelength antennas that reflect very little of the power transmitted by the interrogator. In one embodiment, the dipole antenna is a printed microstrip half wavelength dipole antenna.

Figure 5:
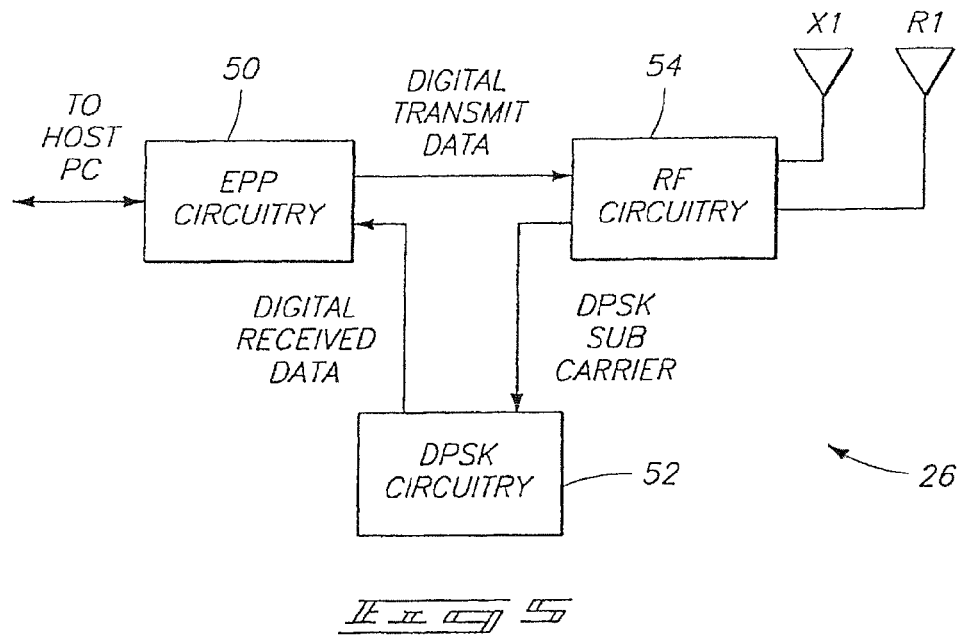
FIG. 5 is a block diagram of an interrogator in accordance with one embodiment of the invention.

Referring to FIG. 5, one embodiment of interrogator 26 is illustrated. The depicted interrogator 26 includes enhanced parallel port (EPP) circuitry 50, DPSK (differential phase shift keyed) circuitry 52, and RF (radio frequency) circuitry 54, as well as a power supply (not shown) and a housing or chassis (not shown). In the illustrated embodiment, the enhanced parallel port circuitry 50, the DPSK circuitry 52, and the RF circuitry 54 respectively define circuit card assemblies (CCAs).

The interrogator uses an IEEE-1284 compatible port in EPP mode to communicate with host computer 48. The EPP circuitry 50 provides digital logic required to coordinate sending and receiving a message with transponder 16. The EPP circuitry 50 buffers data to transmit from host computer 48, converts the data to serial data, and encodes it. The EPP circuitry 50 then waits for data from the transponder 16, converts it to parallel, and transfers it to host computer 48. In one embodiment, messages include up to 64 bytes of data.

The EPP mode interface provides an asynchronous, interlocked, byte wide, bi-directional channel controlled by a host device. The EPP mode allows the host computer to transfer, at high speed, a data byte to/from the interrogator within a single host computer CPU I/O cycle (typically 0.5 microseconds per byte).

RF circuitry 54 interfaces with the transmit and receive antennas X1, R1. Exemplary transmit operations of RF circuitry 54 are described with reference to FIGS. 6-8. RF circuitry 54 modulates the data for transmission to transponder 16, provides a continuous wave (CW) carrier for backscatter communications with transponder 16 (if backscatter communications are employed), and receives and downconverts the signal received from transponder 16 (which comprises a backscatter signal in one embodiment).

Figure 6:
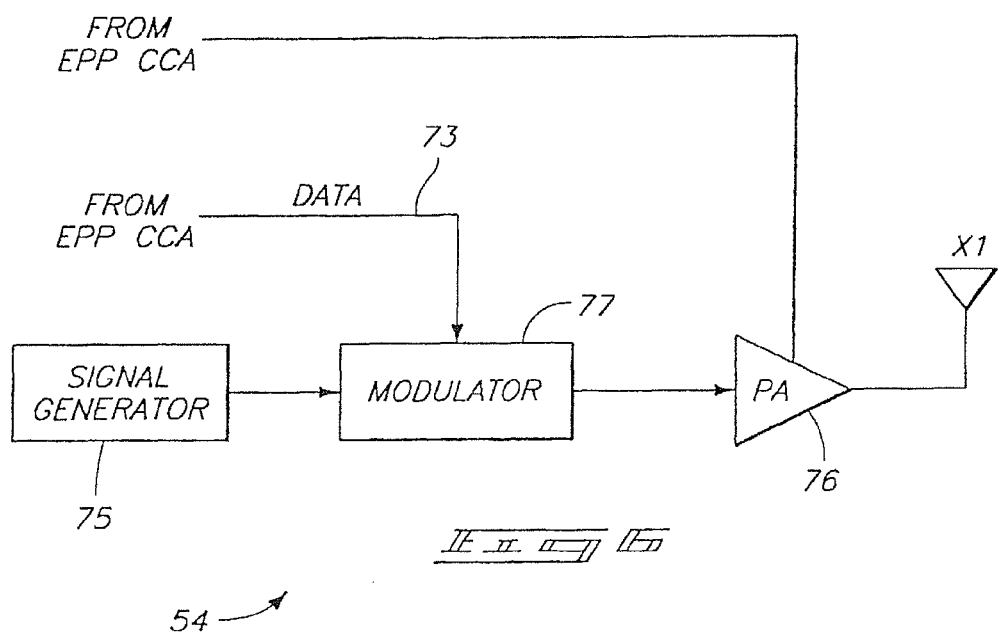
FIG. 6 is a circuit schematic of RF circuitry included in the interrogator of FIG. 5.

Referring to FIG. 6, RF circuitry 54 includes a data path 73, signal generator 75, amplifier 76 and modulator 77. An exemplary signal generator comprises a frequency synthesizer configured to tune the RF continuous wave carrier. In the described embodiment, signal generator 75 is configured to generate a microwave carrier signal (e.g., approximately 2.44 GHz).

RF circuitry 54 defines a transmitter, and is configured to receive data from EPP circuitry 50. Modulator 77 is coupled with data path 73 and signal generator 75. Data path 73 comprises an interconnection such as a wire configured to communicate a data signal to modulator 77. Modulator 77 receives the data from EPP circuitry 50 and amplitude modulates the data onto a carrier in the described embodiment. More particularly, modulator 77 turns the RF on and off (ON OFF KEY).

According to one embodiment, modulator 77 is configured to spread the data signal to provide spread spectrum communications including a spread data signal. Modulator 77 is further configured to amplitude modulate the carrier signal using the spread data signal. In a preferred embodiment, modulator 77 is configured to phase modulate the carrier signal. Phase modulation is utilized to provide suppression of power within the carrier signal in accordance with a preferred embodiment of the invention. Following such amplitude and phase modulation, interrogator 26 is preferably configured to communicate the carrier signal.

Modulator 77 can be configured to spread the data signal using the PN1 pseudo-noise sequence. The first pseudo-noise sequence code (PN1) is encoded with data received by communications path 73. In a preferred embodiment, modulator 77 is thereafter configured to invert the spread data signal. Phase modulation of the carrier signal is responsive to selected inverting of the spread data signal. Encoding the pseudo-noise sequence with the data signal forms a plurality of chips. The chips individually correspond to one of two values, such as logical high (1) or logical low (0). Modulator 77 is configured in a preferred embodiment to selectively invert the chips of the spread signal to implement phase modulation.

In one embodiment, modulator 77 is configured to randomly invert the spread data signal. Modulator 77 is operable in the preferred embodiment to invert the spread data signal using a second pseudo-noise sequence (PN2). The second pseudo-noise sequence code (PN2) is utilized to modulate the phase of the RF carrier in the described embodiment. The second pseudo-noise sequence (PN2) utilized to provide random inversion of the spread data signal comprises aI, 023 bit sequence in one embodiment. Such can be implemented using logic circuitry and shift registers configured in a feedback arrangement in one embodiment.

Randomly changing the phase of the RF carrier signal implements phase modulation and provides the desired effect of spreading the carrier energy over a wider bandwidth. Thus, the communication power can be increased while decreasing the amount of power present in the carrier.

The random code or pseudo-noise sequence (PN2) utilized to implement selected inversion of the spread data signal is preferably band limited to avoid excessive spectral spreading. The carrier signal can be modulated using the band limited data signal.

Modulator 77 can be arranged to implement the inversion operations responsive to the spread data signal being a predetermined value. For example, modulator 77 can be configured to invert one or more chips of the spread data signal responsive to the spread data signal being a logical low value (e.g., zero Volts). The inverting is preferably coordinated or synchronized with the spread data signal.

In particular, modulator 77 is preferably configured such that the second pseudo-noise sequence (PN2) changes state, and implements inversion of the spread data signal, at predetermined places corresponding to the spread data signal. It is preferred to restrict state changes of the PN2 pseudo-noise sequence to periods of time wherein the carrier signal is off during amplitude multiple adjacent modulation. For example, during the presence of zeros within the spread data signal, sufficient time typically exists for the second pseudo-noise sequence to complete a state change while the carrier signal is turned off. Such is preferred to reduce inducing of an amplitude variation within the output communicated signal which may cause error within the associated remote communication device inasmuch as the second pseudo-noise sequence pulses have a limited rise and fall time.

It is desired to reduce communicated energy present in restricted frequency bands in many applications. Modulator 77 is configured in one embodiment to band limit or filter signals within RF circuitry 54. A preferred configuration is to filter baseband signals within modulator 77 before conversion to RF frequencies. Modulator 77 includes a filter configured to band limit the spread data signal in the described embodiment.

Referring to FIG. 7, an exemplary modulator 77 is illustrated. The depicted modulator 77 includes logic circuitry 65, summing amplifier 64, low pass filter 66, attenuator 68, and mixer 69. Modulator 77 is coupled with EPP circuitry 50, code generator 60, code generator 61, signal generator 75, and power amplifier 76.

The depicted logic circuitry 65 comprises an exclusive NOR device 62 and an exclusive OR device 63. Exclusive NOR device 62 is coupled with EPP circuitry 50 via data path 73 and code generator 60. Device 62 is configured to encode the pseudo-noise sequence (PN1) from code generator 60 with data received via path 73, and output a spread 13 data signal. The spread data signal is applied to exclusive OR device 63 as well as code generator 61.

Code generator 61 is configured to change state according to second pseudo-noise sequence (PN2) and responsive to the spread data signal being a predetermined value. The PN2 output of code generator 61 is applied to exclusive OR device 63 and summing amplifier 64. In the described embodiment, code generator 61 is configured to change the state of the outputted signal according to pseudo-noise sequence (PN2) and responsive to the spread data being a logic low value as received from exclusive NOR device 62. The pseudo-noise sequence (PN2) outputted from code generator 61 and applied to exclusive OR device 63 randomly inverts the spread data signal.

The output of exclusive OR device 63 is also applied to summing amplifier 64. Summing amplifier 64 is configured to combine the pseudo-random noise sequences PN1, PN2. Summing amplifier 64 is further configured to output a trilevel or tri-state signal to implement the amplitude modulation and phase modulation of the carrier signal using mixer 69. The carrier signal is modulated using the tri-level signal corresponding to the inverted data signal in the described embodiment.

Combination of the spread data signal and the PN2 pseudo-noise sequence provided by code generator 61 is preferred to reduce the amount of hardware utilized within modulator 77. Summing amplifier 64 preferably includes an offset adjustment 67 utilized to balance the amplitude outputted from mixer 69 to provide maximum carrier suppression in the preferred embodiment.

In the depicted embodiment, the tri-level or state output of summing amplifier 64 is applied to low pass filter 66, attenuator 68 and mixer 69. Low pass filter 66 is configured in the described embodiment to reduce spreading of energy into restricted bands adjacent the desired band for communication. In one embodiment, low pass filter 66 comprises a seven pole filter having a cutoff frequency of 20 MHz. In particular, filter 66 preferably limits the rise and fall time of the spread data signal represented within the tri-level signal as described below.

Attenuator 68 is configured to adjust the amplitude of the outputted signal of low pass filter 66. Discrete components 78 are provided intermediate attenuator 68 and mixer 69. The illustrated discrete components 78 include a series capacitor and a resistor coupled to ground. Discrete components 78 are operable to block DC components within the output of attenuator 68.

The tri-level signal can comprise three states in the described embodiment. A logical high value can be represented be either a positive voltage or negative voltage within the tri-level signal. Communication device 12 is configured to interpret both positive and negative voltages as a logical high value in the described embodiment. A logical low value is preferably approximately zero Volts within the described tri-level signal.

Mixer 69 is configured to invert the phase of the carrier signal responsive to the reception of a negative value within the tri-level signal emitted from summing amplifier 64. A positive voltage within the tri-level signal results in no change of the phase of the carrier signal. Mixer 69 turns the RF carrier signal off responsive to the tri-level signal being zero Volts.

The output of mixer 69 is applied to amplifier 76 in the described embodiment. The depicted amplifier 76 comprises a power amplifier coupled to modulator 77 and configured to amplify the signal. Amplifier 76 is operable responsive to control from EPP circuitry 50 in the illustrated embodiment.

Referring to FIG. 8, operation of modulator 77 is illustrated. Plural signals 90-96 are shown in FIG. 8. Signal 90 represents the data output of EPP circuitry 50. Signal 91 corresponds to the first pseudo-noise sequence (PN 1) signal outputted from code generator 60. Signal 92 represents the output of exclusive NOR device 62. Signal 93 corresponds to the second pseudo-noise sequence (PN2) signal outputted from code generator 61. Signal 94 represents the output of exclusive OR device 63. Signal 95 represents the output of summing amplifier 64 and signal 96 represents the output of low pass filter 66.

Low pass filter 66 is preferably configured to reduce the presence of harmonic information within the tri-level signal. Filter 66 can be configured to pass fundamental frequency information and any other harmonic information necessary for proper operation of remote communication device 12.

For example, low pass filter 66 can be configured to pass fundamental frequency and third harmonic information in one application (e.g., the remote communication device is sensitive to slow rising and falling edges). It IS preferred to adjust filter 66 to provide optimal bandwidth efficiency while effectively communicating data to the associated remote electronic communication device 12.

During continuous wave (CW) transmissions for the backscatter mode, modulator 77 is configured to apply the carrier signal to transmit antenna X1. Transponder 16 is operable to backscatter the signal with a DPSK modulated sub-carrier. Following receipt of the command communication signal from interrogator 26, communication device 12 can be configured to output a reply signal. In backscatter configurations, device 12 is operable to modulate the CW emission from interrogator 26. The backscattered reply signal is received via receive antenna R1 of interrogator 26.

Although not shown in FIGS. 6-8, RF circuitry 54 can include a quadrature downconverter configured to coherently downconvert the received reply signal. RF circuitry 54 can also include automatic gain controls (AGCs) coupled to the quadrature downconverter and configured to set the amplitude of signals I and Q. The I and Q signals, which contain the DPSK modulated sub-carrier, are passed on to DPSK circuitry 52 for demodulation.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted accordance with the doctrine of equivalents.

The invention claimed is:

1. An interrogator comprising:
a data path configured to communicate a data signal;
a signal generator configured to generate a carrier signal; and
a modulator coupled with the data path and the signal generator, the modulator being configured to spread the data signal to define a spread data signal and to both amplitude modulate and phase modulate the carrier signal using the spread data signal before communication of the carrier signal;
wherein the modulator is configured to phase modulate the carrier signal by selectively inverting the phase of the carrier signal using the spread data signal;
wherein the modulator is further configured to band limit the inverted spread data signal; and
wherein the modulator is configured to invert the spread data signal responsive to the spread data signal being a predetermined value.

2. The interrogator according to claim 1, wherein the signal generator is configured to output a microwave carrier signal.

3. The interrogator according to claim 1, wherein the modulator is further configured to modulate the carrier signal using the band limited data signal.

4. The method according to claim 1 wherein the phase modulation is responsive to the inversion of the spread data signal.

* * * * *